United States Patent [19]

Shiono et al.

[11] Patent Number: 5,734,987
[45] Date of Patent: Mar. 31, 1998

[54] NOISE-CONTROLLED COMMUNICATION APPARATUS

[75] Inventors: Takashi Shiono; Koji Higuchi; Noriyo Sasaoka, all of Hyogo, Japan

[73] Assignee: Mitsubishi Denki Kabushiki Kaisha, Tokyo, Japan

[21] Appl. No.: 405,019

[22] Filed: Mar. 16, 1995

[30] Foreign Application Priority Data

Apr. 26, 1994 [JP] Japan ................. 6-088954

[51] Int. Cl.⁶ ................. H04M 1/60; H03G 3/24
[52] U.S. Cl. ............. 455/570; 455/222; 455/303; 381/94.7; 379/390
[58] Field of Search ................. 455/115, 222, 455/89, 345, 297, 306, 221, 296, 570, 303, 235.1; 381/57, 86, 107, 108, 94.3, 94.4, 94.7, 110; 379/388, 389, 390, 391

[56] References Cited

U.S. PATENT DOCUMENTS

| | | |
|---|---|---|
| 3,894,187 | 7/1975 | Shibata et al. . |
| 4,380,824 | 4/1983 | Inoue ................. 455/297 |
| 4,891,837 | 1/1990 | Walker et al. . |
| 4,944,018 | 7/1990 | Bose et al. ................. 381/57 |
| 4,984,265 | 1/1991 | Connan et al. ................. 379/390 |
| 5,018,205 | 5/1991 | Takagi et al. ................. 381/86 |
| 5,199,065 | 3/1993 | von Zitzewitz et al. ................. 379/389 |
| 5,204,971 | 4/1993 | Takahashi et al. ................. 381/86 |
| 5,208,866 | 5/1993 | Kato et al. ................. 381/107 |
| 5,222,106 | 6/1993 | Satoh et al. ................. 455/103 |
| 5,241,692 | 8/1993 | Harrison et al. ................. 455/297 |
| 5,434,922 | 7/1995 | Miller et al. ................. 381/108 |
| 5,459,786 | 10/1995 | Tomiyori et al. ................. 455/222 |
| 5,485,515 | 1/1996 | Allen et al. ................. 379/391 |
| 5,526,419 | 6/1996 | Allen et al. ................. 379/387 |

FOREIGN PATENT DOCUMENTS

| | | |
|---|---|---|
| 0163545 | 12/1985 | European Pat. Off. . |
| 0364383 | 4/1990 | European Pat. Off. . |
| 0501783 | 9/1992 | European Pat. Off. . |
| 0661858 | 7/1995 | European Pat. Off. . |
| 0674415 | 9/1995 | European Pat. Off. ................. 455/297 |
| 1284128 | 11/1989 | Japan ................. 455/297 |
| 4-137830 | 5/1992 | Japan ................. 455/297 |
| 4-297133 | 10/1992 | Japan ................. 455/297 |
| 630090 | 2/1994 | Japan . |
| 2093290 | 8/1982 | United Kingdom . |
| 2261138 | 5/1993 | United Kingdom . |
| 2274375 | 7/1994 | United Kingdom . |
| 2284970 | 6/1995 | United Kingdom . |
| 2285376 | 7/1995 | United Kingdom . |
| 9306679 | 4/1993 | WIPO . |

OTHER PUBLICATIONS

"Mobile Station—Land Station Compatibility Specification", EIA/TIA Standard, Mobile Station–Land Station Compatibility Specification EIA/TIA–553, Electronic Industries Association, Sep. 1989.

Primary Examiner—Reinhard J. Eisenzopf
Assistant Examiner—Lester G. Kincaid
Attorney, Agent, or Firm—Rothwell, Figg, Ernst & Kurz

[57] ABSTRACT

A noise-controlled communication apparatus reduces an annoying effect to the other speaker due to an ambient noise on the transmitting side and improves articulation of the receiving voice under noise. In a noise-controlled communication apparatus, a transmitting level detector detects a transmitting level above a threshold. Then, a mode controller enters to a transmitting mode. When the mode controller enters to the transmitting mode, a control mode switching circuit reduces attenuation of a transmitting signal. When the noise-controlled communication apparatus detects a receiving signal, the mode controller enters to a receiving mode for passing through the receiving signal. When the transmitting signal and receiving signal are not detected, the mode controller enters to an idle mode for attenuating the transmitting signal and receiving signal to half.

9 Claims, 18 Drawing Sheets

F I G. 3
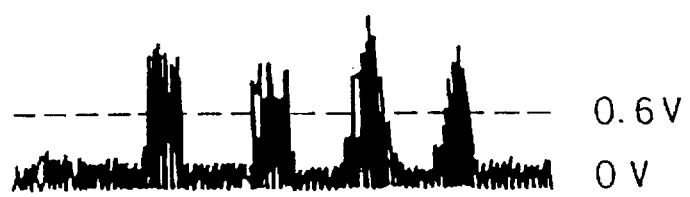

F I G. 5

| MODE | POTENTIAL OF VOLTAGE HOLDING CIRCUIT 25 | POTENTIAL OF PIN 8 | POTENTIAL OF PIN 10 | ATTENUATION OF VARIABLE ATTENUATOR 31b | ATTENUATION OF VARIABLE ATTENUATOR 31c | VCA1 | VCA2 |
|---|---|---|---|---|---|---|---|
| TRANSMITTING MODE "0" | ↗ | ↷ | ↶ | ↷ | ↶ | ↷ | ↶ |
| RECEIVING MODE "1" | ↗ | ↶ | ↷ | ↶ | ↷ | ↶ | ↷ |
| IDLE MODE "0.5" | ↑ | ↑ | ↑ | $\frac{1}{2}$ | $\frac{1}{2}$ | $\frac{1}{2}$ | $\frac{1}{2}$ |

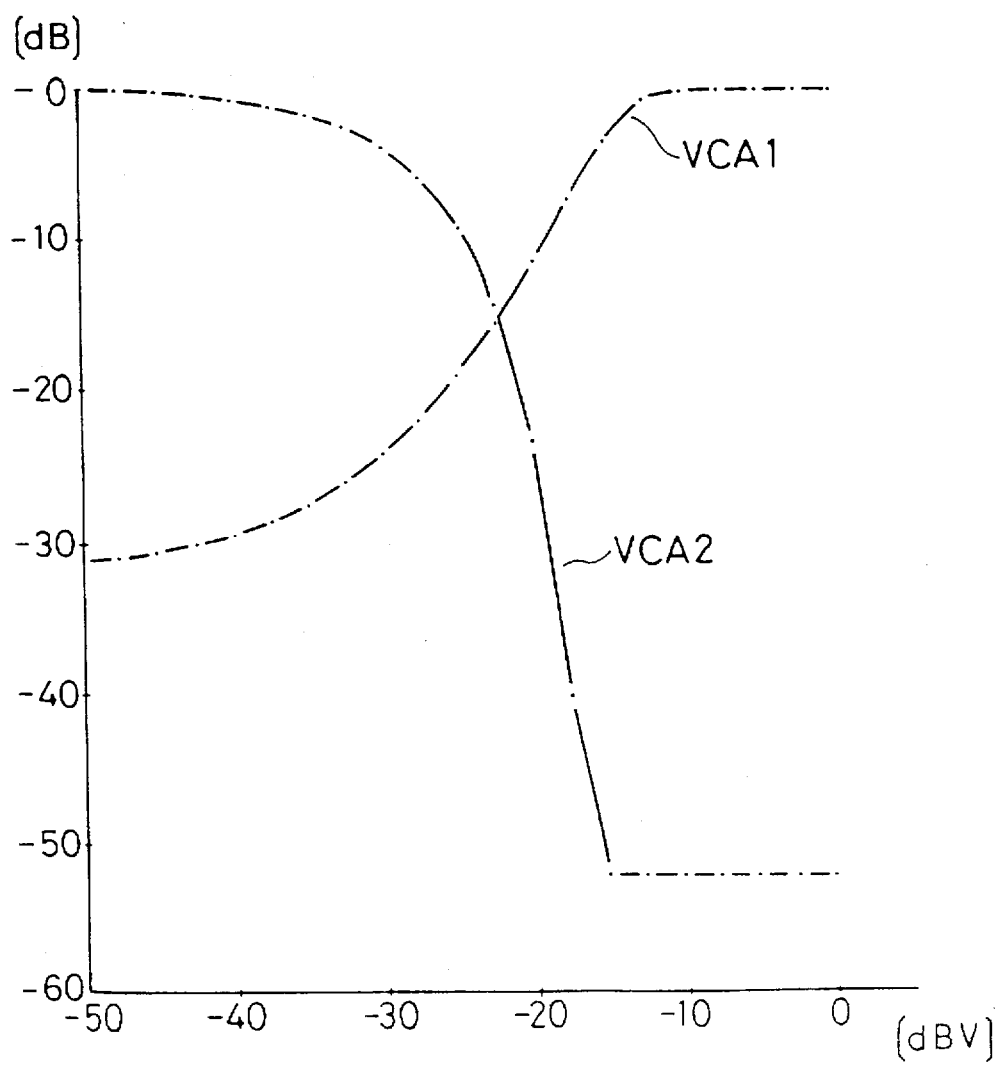
F I G. 7
INPUT LEVEL OF INPUT TERMINAL 32

FIG. 17 PRIOR ART

| PIN NUMBER | TITLE | USAGE | STANDARD DC VOLTAGE |
|---|---|---|---|
| 1 | POWER | 8~15V DC IS APPLIED (RATED 12 VOLT) | — |
| 2 | INPUT 1 | MAXIMUM ALLOWABLE INPUT 3.4Vrms (STANDARD) | 5.5V |
| 3 | OUTPUT 2 | | 4.8V |
| 4 | REFERENCE VOLTAGE OUTPUT | MAXIMUM OUTPUT CURRENT 10mA (STANDARD), WITH SHORT GUARD CIRCUIT | 5.2V |
| 5 | FILTER | | 12V |
| 6 | NO CONNECTION | AVAILABLE FOR GND WIRING | — |
| 7 | GROUND | | — |
| 8 | VOLUME/VOLUME 1 CONTROL | CONTROLLING 2chs COMPATIBLE VOLUME OR ch1 VOLUME ACCORDING TO 0~5.2V DC | — |
| 9 | SHOCK NOISE REDUCTION FOR PASS THROUGH SWITCH | EXCESS SOUND ON HEARING IS REDUCED BY SWITCHING BETWEEN PASS THROUTH AND VCA SLOWLY WITH TIME CONSTANT. TIME CONSTANT IS SET ACCORDING TO OUTSIDE CAPACITANCE C $T(sec) = 1.2 \times C \times 20k$ | 5.2V DURING PASS THROUGH 0V DURING VCA |
| 10 | BALANCE/VOLUME 2 CONTROL | CONTROLLING BALANCE OR ch 2 VOLUME ACCORDING TO 0~5.2V DC | — |
| 11 | PASS THROUGH/VCA SW | IF 0V IS SET, VCA FUNCTION WORKS IF 5.2V IS SET, INPUT SIGNAL IS PASSED THROUGH TO BE OUTPUT | — |
| 12 | CONTROL MODE SWITCHING | IF 0V IS SET, OPERATION IS AS FOLLOWS: TERMINAL 8 : ch 1 VOLUME TERMINAL 10 : ch 2 VOLUME IF 5.2V IS SET, OPERATION IS AS FOLLOWS: TERMINAL 8 : TWO CHANNELS COMPATIBLE VOLUME TERMINAL 10 BALANCE | — |
| 13 | OUTPUT 2 | | 4.8V |
| 14 | INPUT 2 | MAXIMUM ALLOWABLE INPUT 3.4Vrms (STANDARD) | 5.5V |

NOISE-CONTROLLED COMMUNICATION APPARATUS

BACKGROUND OF THE INVENTION

1. Field of the Invention

This invention relates to a communication apparatus such as a mobile station, which is intended for use in environments having a high ambient noise level. More specifically, this invention relates to a communication apparatus which aims at noise reduction and improved quality of transmission.

2. Description of the Prior Art

A hands free system is shown in FIG. 14, as a first prior art, which can be employed in a communication apparatus. In FIG. 14, a speech control IC 31 is used in a standard communication apparatus. An input terminal 32 receives a receiving signal from the communication apparatus. A receiving amplifier 33 amplifies the receiving signal and a receiving terminal 34 outputs it to a receiver such as a speaker not shown in the figure. In addition, a high pass filter 35, a DC converter 36, and control circuits 37 and 38 are provided. Further, a microphone terminal 41, a transmitting amplifier 42, a high pass filter 43, and a low pass filter 44 are provided in the hands free system. Pin numbers of the IC packaged chip are shown by the reference numerals enclosed in circles.

FIG. 15 is an external perspective view of the speech control IC 31.

FIG. 16 shows pin assignments of the speech control IC 31.

FIG. 17 is a pin description table of the speech control IC 31. The speech control IC 31 may, for example, utilize a 2-channel electric volume valance made by Mitsubishi Denki Kabushiki Kaisya (model name: M51132L, FP). The 2-channel electric volume valance is a Voltage Controlled Amplifier (VCA) IC which is intended for use in an electric volume of audio visual apparatus. As shown in a system configuration of FIG. 18, the 2-channel electric volume valance is used for analog signal processing of the front stage of the power amplifier. According to the DC voltage level, it can operate with either of the two channels in an independent volume control mode or the two channels in a compatible volume control mode.

The following examples deal with the case where the input signal volume of two channels is controlled by using the two channels in an independent volume control mode.

As the description of pin 12 of FIG. 17 shows, it is possible to operate pin 8 as the volume control of channel 1 and pin 10 as the volume control of channel 2 by connecting the pin 12 to ground.

The operation of the prior art configuration will now be described.

The receiving signal input from the input terminal 32 passes through pin 2 of the speech control IC 31 to a variable attenuator 31c. The attenuated receiving signal is then supplied to the receiver terminal 34 through the receiving amplifier 33 and to the receiver. A part of the receiving signal passes through the high pass filter 35, where the low frequency component of ambient noise (i.e., noise on the side of a mating user of the telephone connected to the circuit) is attenuated. Further, after the DC conversion at the DC convertor 36, the receiving signal passes through control circuits 37 and 38 to pins 8 and 10 at the speech control IC 31. Control circuits 37 and 38 output control voltage to pins 8 and 10 at the speech control IC 31 according to reference voltage of pin 4 of the speech control IC 31. The control circuit 37 generates a control signal for controlling the speech control IC 31 with reference voltage. The control signal is input to a control terminal (pin 8) of a control mode switching circuit 31a. Similarly, the control circuit 38 generates a control signal after phase inversion according to reference voltage. The control signal is input to a control terminal (pin 10) of the control mode switching circuit 31a. The control mode switching circuit 31a in the speech control IC 31 reduces attenuation of the variable attenuator 31c. The receiving signal input to the pin 2 is output to the pin 3 without attenuation. The receiving signal is then amplified at the input amplifier 33 and sent to a receiver from the receiving terminal 34.

On the other hand, a signal from a microphone is input from the microphone terminal 41 through the transmitting amplifier 42 and passes through the high pass filter 43 and the low pass filter 44 to pin 14 of the speech control IC 31. The signal is output to pin 13 always without being attenuated by a variable attenuator 31b and is transmitted through a terminal 45 as a transmitting signal.

Thus, in a normal condition (i.e., when a receiving signal is not detected), attenuation is not performed on the transmitting side and attenuation is performed on the receiving side.

However, when the receiving signal is detected, attenuation on the receiver side is eliminated and attenuation is performed on the transmitter side. The operation of a variable attenuator is so fast that speech communication quality similar to full duplex talking can be obtained in this speech switching system.

A communication apparatus is shown in FIG. 19 as a second prior art.

In the communication apparatus of FIG. 19, a microphone 61, a speaker 62, a transmitting amplifier 63, a transmitting and receiving radio equipment 64, a receiving amplifier 65, a keyboard and an indicator 66 are provided. A bandpass filter 67 filters out frequencies except for those in the speech band. A sound volume controller 68 controls the level of amplification of the receiving amplifier 65.

The operation of the communication apparatus of this configuration will now be described. A transmitting signal is generated at the microphone 61. Then, the transmitting signal is sent through the transmitting amplifier 63 to the radio equipment 64 which performs amplifier modulation. The transmitting signal is then sent to the other station. On the other hand, a receiving signal from the other station is output through the receiving amplifier 65 to the speaker 62. In order to detect whether ambient noise is at a high level or not, a part of the output of the transmitting amplifier 63 is filtered by the bandpass filter 67. If the ambient noise level, namely, low or high sound range level is large, the amplification level of the receiving amplifier 65 is raised via the sound volume controller 68. In other words, as the noise level in the transmission signal from the microphone 61 becomes large, the gain of the receiving amplifier 68 is increased for the receiving signal.

Thus, the receiving signal becomes louder as the noise level of the transmitting microphone becomes louder.

A communication apparatus is shown in FIG. 20 as a third prior art.

In the communication apparatus of FIG. 20, a microphone 71, a speaker 72, a speech level detect controller 73, a microphone signal amplifier 74, a noise level detect controller 75, a speaker driving amplifier 76, a transmitting receiving circuit 77, and an antenna 78 are provided.

The operation of this apparatus will be described. A transmitting signal from the microphone 71 is sent to the other side through the microphone signal amplifier 74 and the transmitting receiving circuit 77. On the other hand, a receiving signal from the other side passes through the antenna 78 and the transmitting receiving circuit 77. Then, the receiving signal is amplified at the speaker driving amplifier 76 and output to the speaker 72.

The microphone signal amplifier 74 increases its amplification level when the sound volume of the microphone 71 is detected, that is, when the speech level detect controller 73 detects the input speech signal whose speech portion is filtered. Accordingly, in case of transmitting voice, the voice is controlled so as to increase the speech amplification level and is then sent to the other side. On the other side, the level corresponding to the noise range of receiving signal from the microphone 71 is integrated. The noise level detect controller 75 recognizes the noise level based on the integrated level. When the noise level detect controller 75 recognizes the noise, the amplification level of the speaker driving amplifier 76 is increased. That is, when the ambient noise becomes loud, the receiving signal amplified and output at a higher amplification level.

In the communication apparatus of the above described first prior art, in a normal condition (i.e., when a receiving signal is not detected), there is no attenuation on the transmitter side. Therefore, the noise on the transmitter side is captured and sent to the other side causing annoying communication effects. In order to prevent such situation on the other side, the low frequency component of the receiving signal is attenuated by the high pass filter but there is still a problem of the remaining high frequency noise. In addition, the sound volume level is unstable because the attenuation of the receiving variable attenuator changes according to the receiving speech level.

In the configuration of the second prior art, the sound volume of the receiving signal is controlled according to the noise level on the transmitting side, the sound volume of the receiving signal varies greatly and causes an annoying communication effect.

In the configuration of the third prior art, the gain of the transmitting signal becomes large when there is a transmitting signal. Therefore, a receiver can easily capture the speech from a transmitter whereas the apparatus becomes more complicated in structure. Further, there is a problem that an annoying communication effect on the receiver side is caused since the receiving signal becomes more strongly amplified when the ambient noise becomes loud as described in the second prior art.

SUMMARY OF THE INVENTION

This invention addresses the foregoing problems and provides a noise-controlled communication apparatus which reduces the influence of ambient noise on the transmitting side and which enables a clear speech communication without instability of the receiving voice signal.

According to one aspect of this invention, the communication apparatus for transmitting and receiving signals includes:

a level controller operable in a plurality of modes, at least one of which modes is a transmitting mode, for receiving a transmitting signal to be transmitted by the apparatus and for adjusting through a first variable attenuator means the level of the transmitting signal prior to the transmission thereof based on a mode selected from the plurality of modes;

a level detector for detecting the level of the transmitting signal and for outputting a level signal responsive to the detected level of the transmitting signal; and a mode controller connected to receive the level signal from the level detector for controlling the level controller to control the level of attenuation of the variable attenuator means in response to the level signal and for setting the apparatus in a transmitting mode in which the attenuation of the transmitting signal by the variable attenuator means is substantially reduced.

According to another aspect of this invention, the communication apparatus for transmitting and receiving signals includes:

a level controller for receiving transmitting and receiving signals, for attenuating the levels of the receiving and transmitting signals when the receiving and transmitting signals do not include a voice signal, and for outputting receiving and transmitting signals; and a mode controller having at least three modes comprising:
  (a) a receiving mode which passes through the receiving signal without attenuation and which attenuates the transmitting signal;
  (b) a transmitting mode which attenuates the receiving signal and which passes through the transmitting signal without attenuation; and
  (c) an idle mode which attenuates both of the receiving and transmitting signals; and means for setting the mode controller in one of the three modes based on the level of the receiving and transmitting signals whereby the level controller selectively attenuates the receiving and transmitting signals according to the mode in which the mode controller is set.

According to another aspect of this invention, the communication apparatus for transmitting and receiving signals includes:

a noise level detector for detecting the noise level in the vicinity of the communication apparatus and for outputting a noise level signal;

a frequency characteristic changing circuit for receiving a receiving signal and the noise level signal and for changing the frequency characteristics of the receiving signal based on the level of the noise level signal.

According to one aspect of this invention, the communication method for a system wherein a transmitting signal and a receiving signal are selectively attenuated based on the level of the transmitting signal and the receiving signal, the communication method includes the steps of:

detecting the level of the transmitting signal;

detecting the level of the receiving signal;

selecting, based on the detected levels of the is transmitting and receiving signals, one of three modes comprising:
  (a) a receiving mode which passes through without attenuation the receiving signal and attenuates the transmitting signal;
  (b) a transmitting mode which attenuates the receiving signal and passes through without attenuation the transmitting signal; and
  (c) an idle mode which attenuates both of the receiving and transmitting signals; and attenuating at least one of the transmitting signal and the receiving signal based on the selected mode.

According to another aspect of this invention, the communication method for receiving a receiving signal includes the steps of:

detecting the noise level in the vicinity of the receiving signal; and changing the frequency characteristics of the receiving signal based on the noise level so detected.

BRIEF DESCRIPTION OF THE DRAWINGS

FIG. 3 shows a signal level of the operation of a transmitting level detector which has the configuration depicted in FIG. 2;

FIG. 5 shows a comparison of a transmitting mode, a receiving mode and an idle mode;

FIG. 7 shows characteristics of levels of VCA1 and VCA2 in dB;

FIG. 17 is a pin description table of the speech control IC according to the first prior art;

DESCRIPTION OF THE PREFERRED EMBODIMENTS

Embodiment 1

Figure 1:
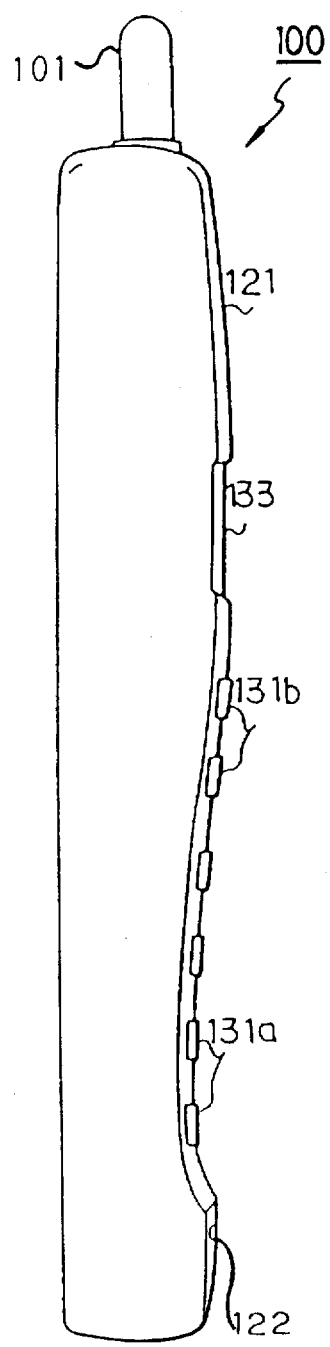
FIG. 1(a) is a side view of a cellular phone according to one embodiment of the present invention.
FIG. 1(b) is a front view of the cellular phone of FIG. 1(a) according to one embodiment of the present invention.
Figure 1:
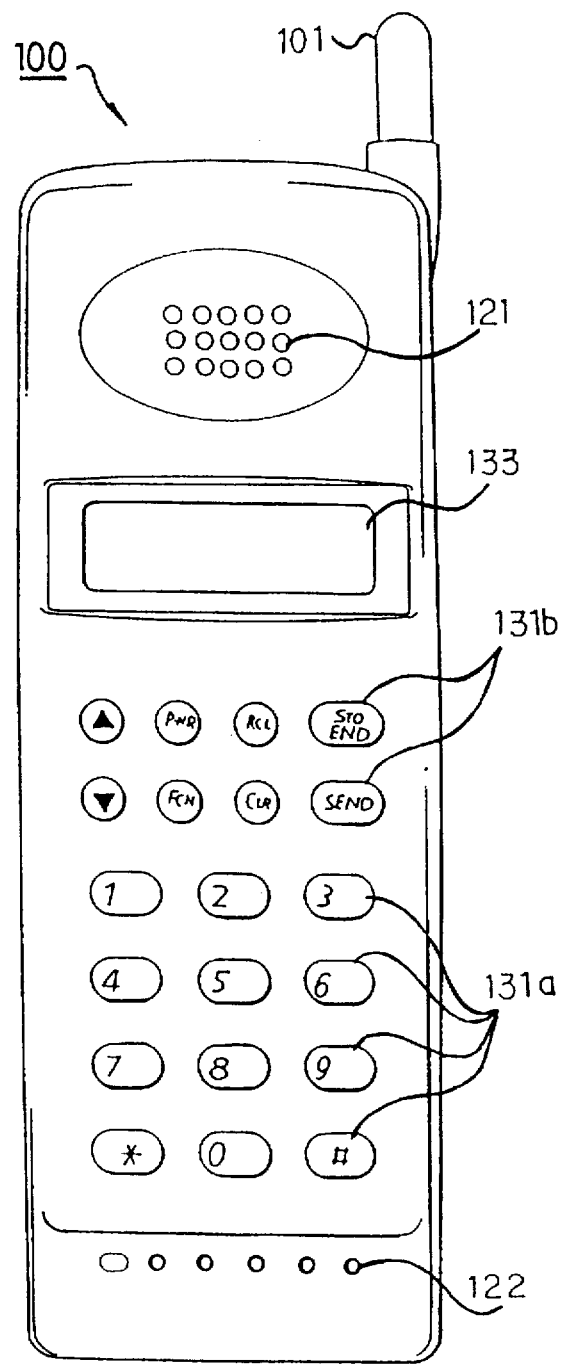

FIGS. 1(a) and 1(b) illustrate a mobile station according to a first embodiment of this invention. A mobile station 100 has an antenna 101 to transmit and receive an electric wave signal, a receiver 121 and a transmitter 122. Further, it has a dial key 131a to dial and a function key 131b. And, it has a display 133 to indicate alphanumeric characters and symbols.

Figure 2:
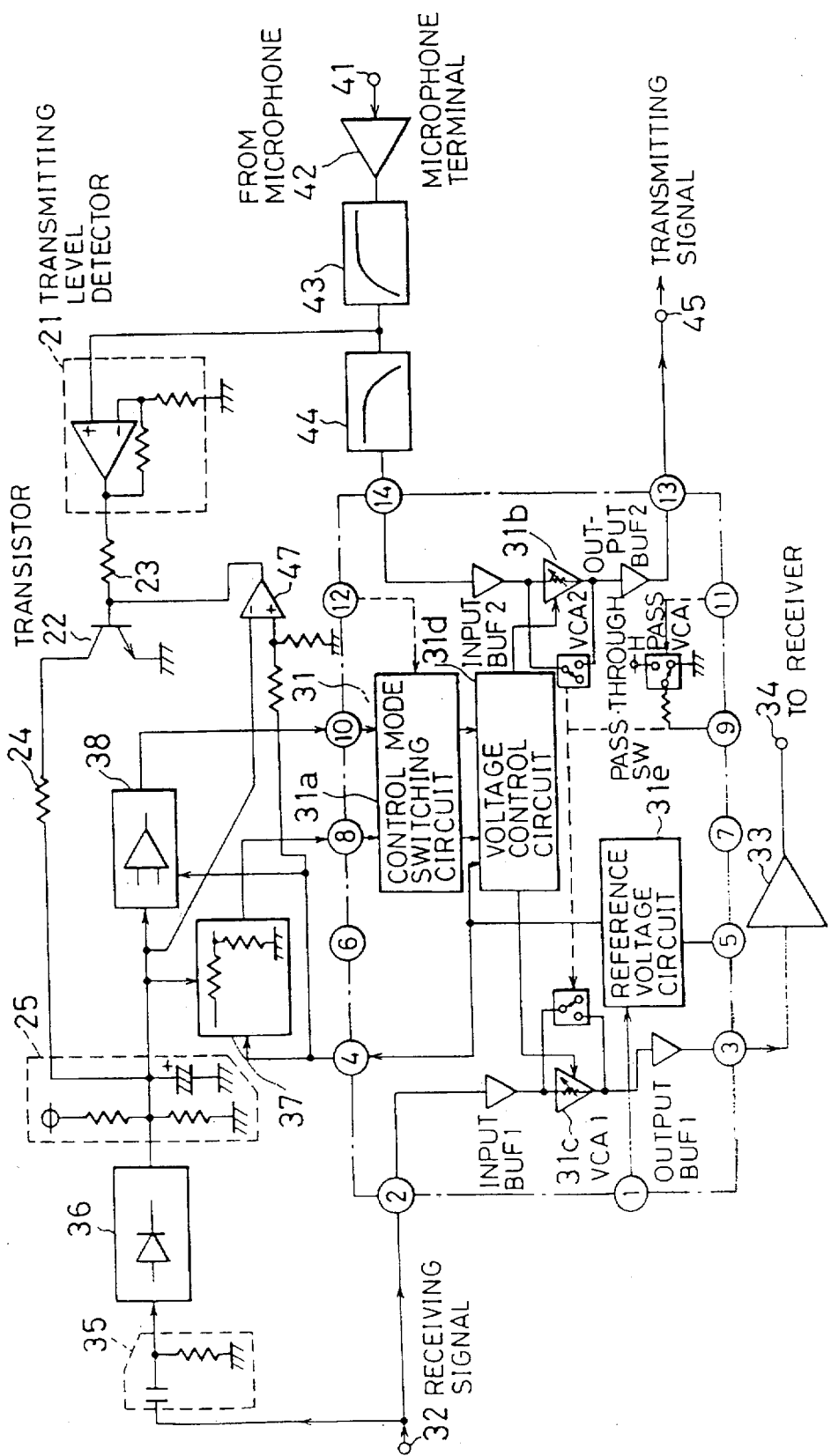
FIG. 2 shows a block diagram of a noise-controlled communication apparatus of one of embodiments of the present invention.
Figure 14:
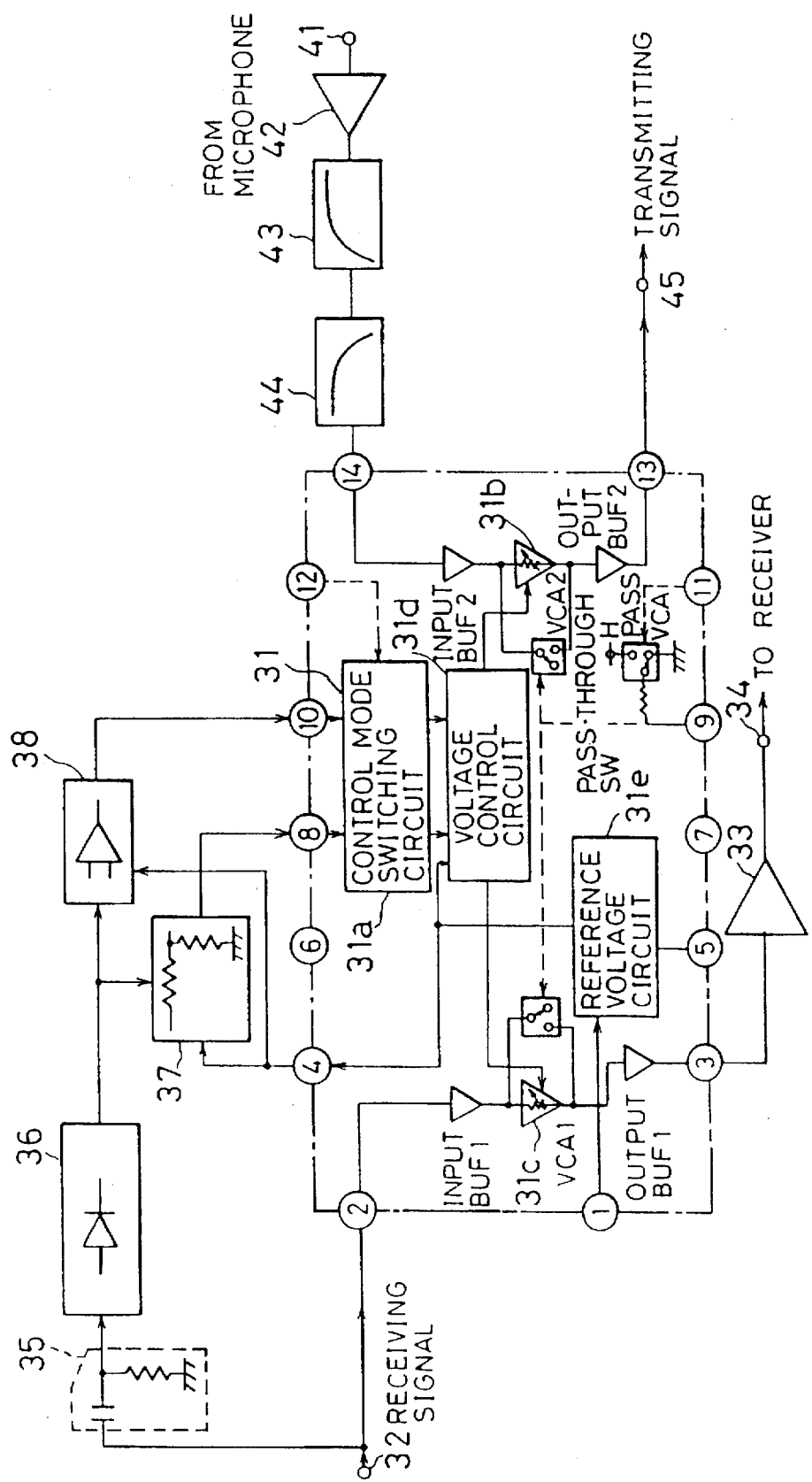
FIG. 14 shows a block diagram of a communication apparatus of a first prior art.
Figure 15:
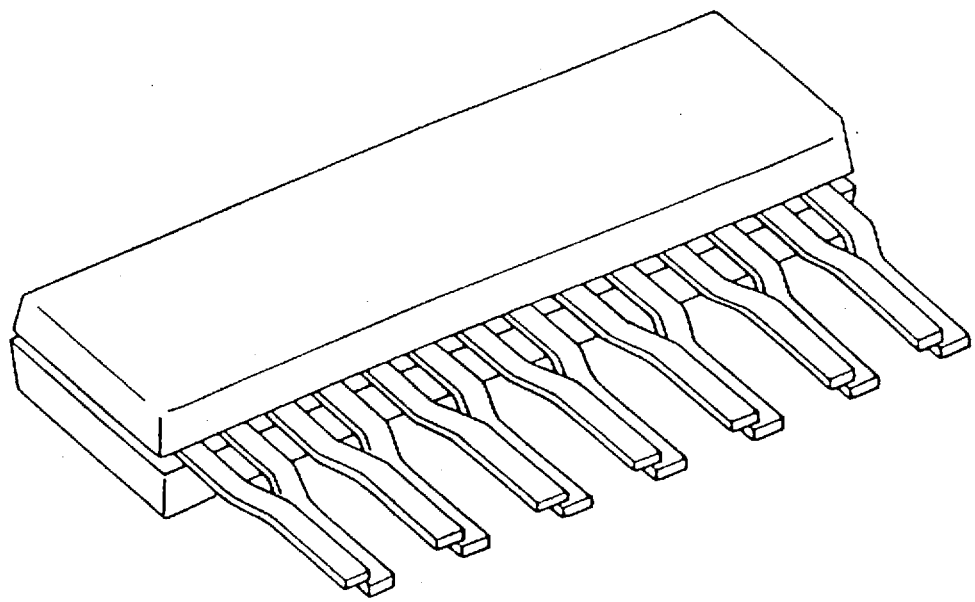
FIG. 15 shows an outward form of a speech control IC according to the first prior art.
Figure 16:
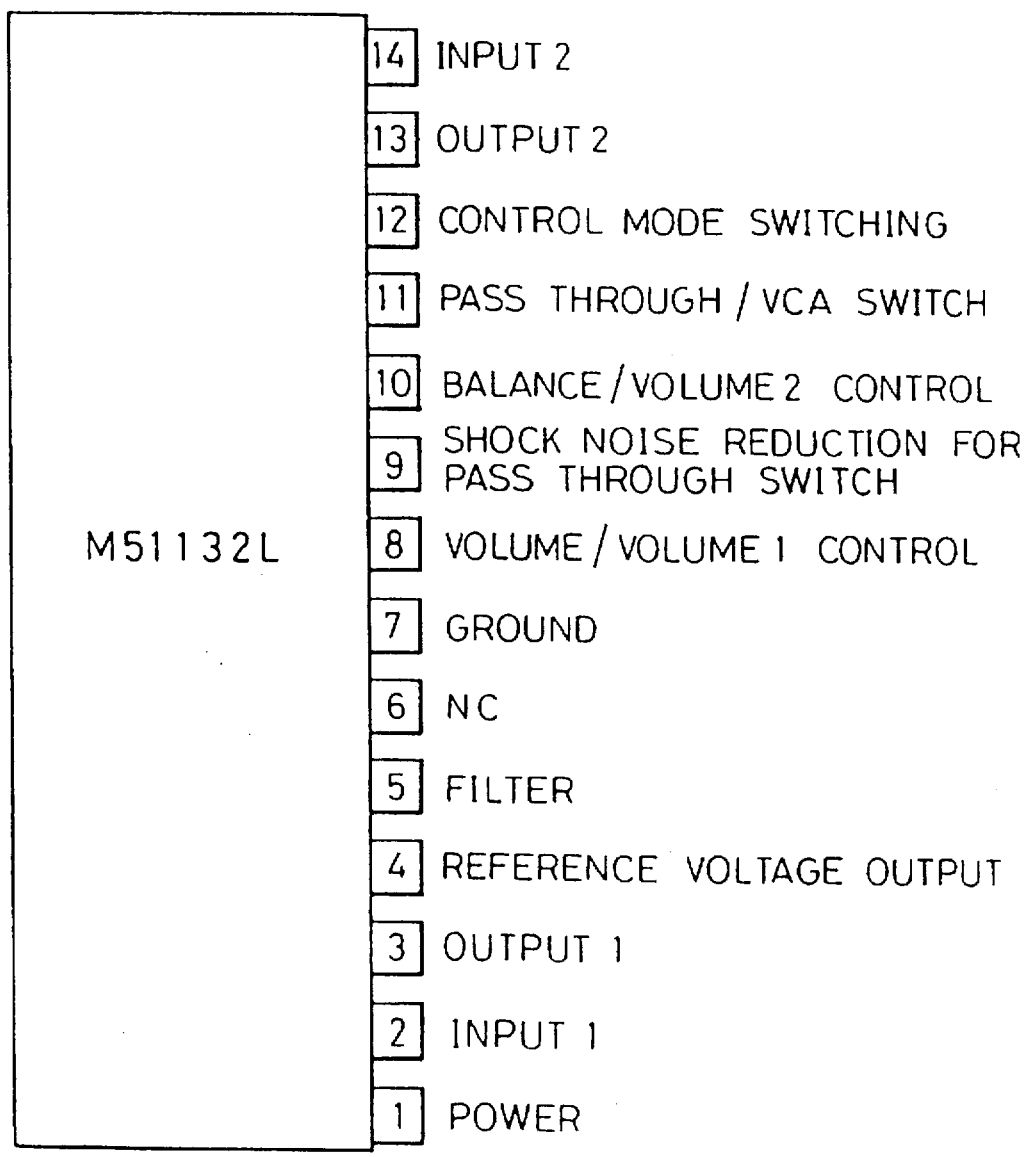
FIG. 16 shows pin assignments of the speech control IC according to the first prior art.
Figure 18:
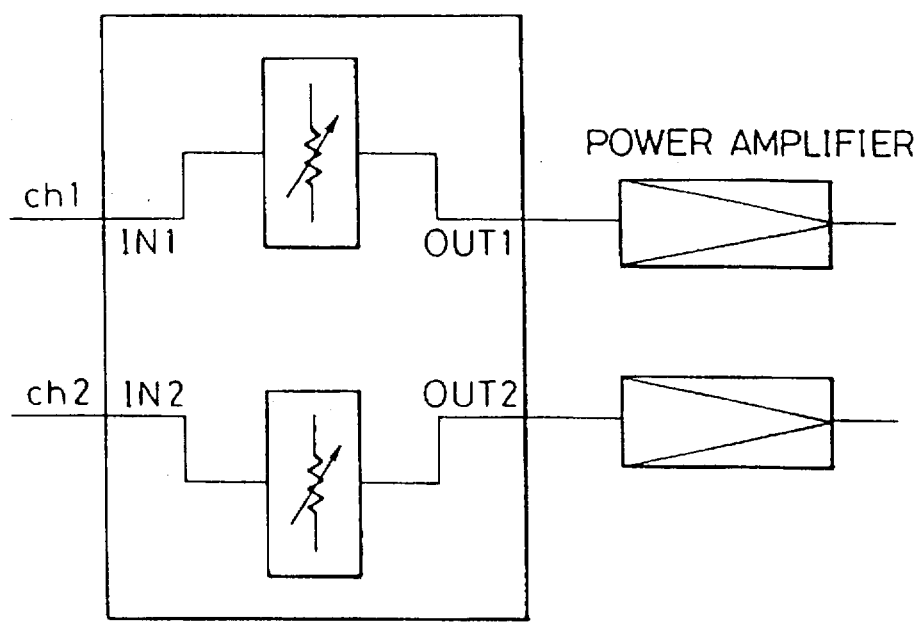
FIG. 18 shows a system configuration of the speech control IC according to the first prior art.
Figure 19:
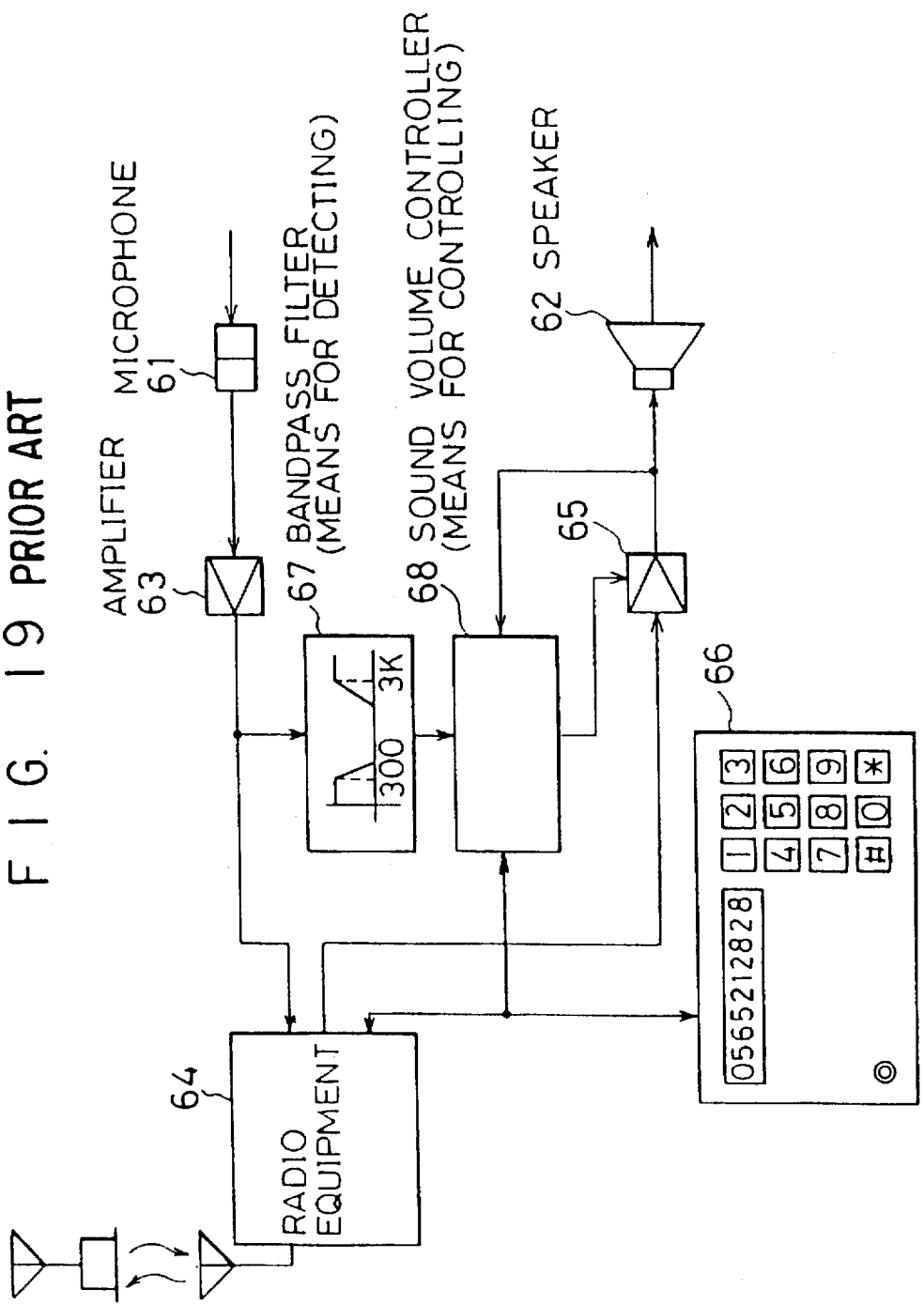
FIG. 19 is a block diagram of a communication apparatus of a second prior art; and, FIG. 20 is a block diagram of a communication apparatus of a third prior art.
Figure 20:
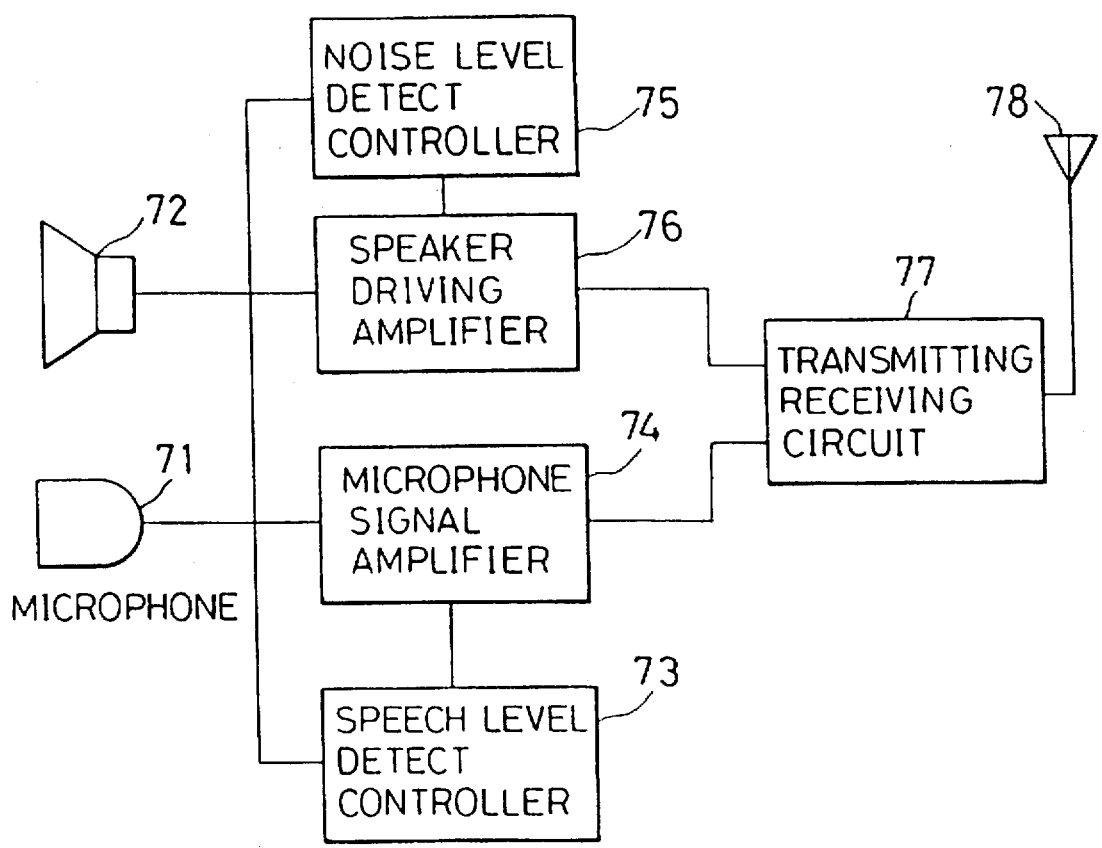

FIG. 2 shows a configuration of one of embodiments of a noise-controlled communication apparatus according to this invention. In FIG. 2, a transmitting level detector 21, a transistor 22, an input resist 23, a load resist 24, a voltage holding circuit 25, and a comparator 47 are provided. The other component parts are equivalent to the prior art component parts designated by the same reference numerals shown in FIG. 14.

FIG. 3 illustrates a transmitting signal input to the transmitting level detector 21 and the transistor 22 from a microphone.

Figure 4:
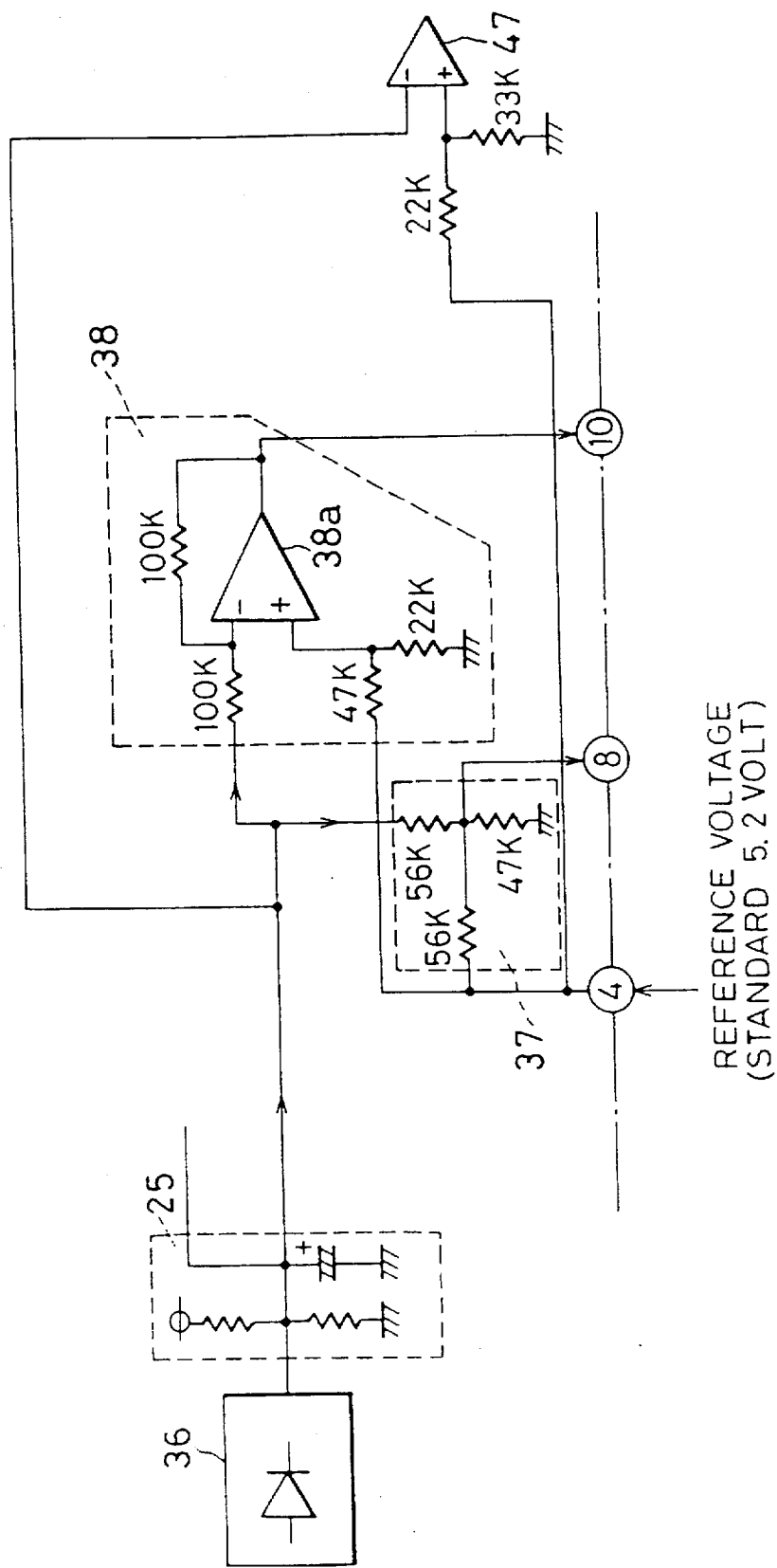
FIG. 4 shows a control circuit of the first embodiment.

FIG. 4 is a detailed circuit diagram of control circuits 37 and 38 shown in FIG. 2.

The operation of the communication apparatus as configured in FIG. 2 will now be described.

A transmitting signal input at the microphone terminal 41 from a transmitting microphone passes through a transmitting amplifier 42 and a high pass filter 43. Then, a part of the signal is input to the transmitting level detector 21. The high pass filter 43 is, for example, a high pass tertiary filter having cut off frequency of about 700 Hz. Since noise generally has a HOTH spectrum characteristic, the signal is input to the transmitting level detector 21 after the high pass filter 43 attenuates ambient noise components. The operation level of the transmitting level detector 21 is set at the level designated on the dotted line of FIG. 3. When a transmitting signal level exceeds the set predefined level, for example, the level shown in FIG. 3, when the value above the 0.6 volt is detected, the transistor 22 is activated.

The voltage holding circuit 25 holds a constant potential. The potential gives a constant voltage to pins 8 and 10 of the speech control IC 31. This status is called an idle mode status. In a normal condition (i.e., when a receiving signal is not detected), the idle mode status, in other words, the interim status between the transmitting mode and the receiving mode is maintained by the constant potential. One feature of the present invention is that an idle status is provided. That is, a control mode switching circuit 31a is controlled to have a receiving mode, a transmitting mode and an idle mode as shown in FIG. 5. The receiving mode status has level 1 and the transmitting mode status has level 0. The status which has no transmitting mode and receiving mode is determined to be the idle mode status having level 0.5. The control of the variable attenuators 31b and 31c establishes each mode. Each of the three modes is described hereinafter, referring to FIG. 5.

The following is a description of the idle mode. In the idle mode status, in other words, the interim status between the transmitting and receiving mode statuses, the receiving signal input from pin 2 is attenuated approximately in half at the variable attenuator 31c and output to the receiving amplifier 33 from pin 3.

The transmitting signal input from pin 14 is attenuated approximately in half at the variable attenuator 31b. The transmitting signal is then output to pin 13 and transmitted from a transmitting terminal 45.

The transmitting mode will now be described. The transmitting level detector 21 has a threshold of 0.6 volt, for example. When the transmitting level is above the threshold, the transmitting signal is recognized and the transistor 22 is turned on. When the transistor 22 is turned on, the potential of the voltage holding circuit 25 is automatically decreased by operation of transistor 22. When pin 10 of the speech control IC 31 has a high potential, the control mode switching circuit 31a reduces the attenuation of the variable attenuator 31b. Namely, the transmitting signal is transmitted without attenuation from the terminal 45.

For example, the level of transmitting level detector 21 is adjusted so as to attain the threshold level of 0.6 volt as shown in FIG. 3 when a transmitting level input to the microphone terminal 41 from the microphone includes HOTH noise of about 70 dB, for example. 70 dB is selected in this case because the noise level in an automobile running at 100 km/h is 66 dB on the average. Thus, even in a moving automobile, the transmitting mode is started only when a voice signal on the microphone is detected and attenuation of the variable attenuator is eliminated. On the other hand, when no voice is detected, attenuation at the variable attenuator is enough to reduce the ambient noise. The receiving mode will now be described. When a receiving signal is input to the voltage holding circuit 25 through the high pass filter 35 and a DC convertor 36, the potential of a voltage holding circuit 25 is raised. Herein, the DC convertor 36 is an AC/DC convertor. When a receiving signal (AC signal) is input, a DC signal in proportion to the AC signal is output from the DC convertor 36 and the potential of the voltage holding circuit 25 is thus raised. In this case, since output level of the comparator 47 becomes ground level, the transistor 22 is not turned on even when a wraparound of the voice from the speaker to the microphone occurs. As a result, the potential of pin 8 of the speech control IC 31 is raised. Then, according to the operation of the control mode switching circuit 31a, attenuation of the variable attenuator 31c is eliminated. Thus, receiving signal is transmitted to the input amplifier 33 without attenuation and a clear receiving signal can be obtained.

In either mode, both of the potentials of pins 8 and 10 do not rise simultaneously. Since the control circuit 38 has a phase invertor (operation amplifier) 38a, the potential at pin 10 is reduced when the potential from the voltage holding circuit 25 rises. And, since the control circuit 37 is composed of resistances only, the potential does not reverse.

Figure 6:
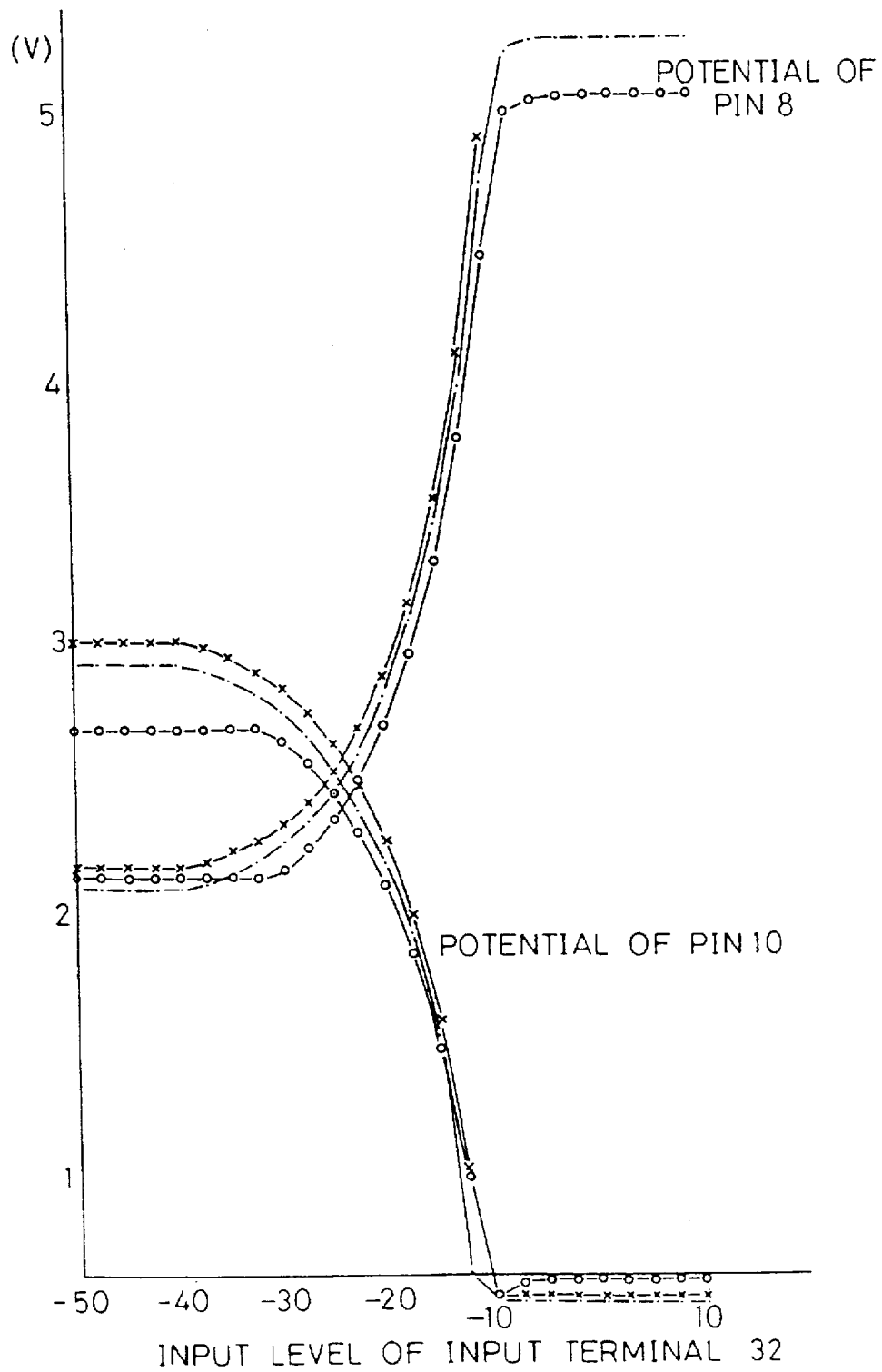
FIG. 6 shows characteristics of electric voltages of pins 8 and 10.

FIG. 6 illustrates a view of the potentials of pins 8 and 10 to the receiving signal level input from the input terminal 32. Namely, FIG. 6 shows data at the time of temperature test in three types of cases. On the graph, "." shows data in case that the temperature is 25 centigrade, "x" shows data in case that the temperature is 60 centigrade, and "o" shows data in case that the temperature is −30 centigrade. In each case, the potentials of both pins 8 and 10 do not rise simultaneously. That is, when one potential rises, the other potential falls. Especially, in this case, when the receiving signal level rises, the potential of pin 8 falls. Therefore, the receiving mode as shown in FIG. 5 is started.

FIG. 7 illustrates a view of the levels of VCA1 and VCA2, which are outputs of variable attenuators 31b and 31c. As the receiving signal level rises, the potential at pin 8 rises. Therefore, the attenuation of the variable attenuator 31c is eliminated. As a result, the level of VCA1 rises. On the other hand, since voltage at pin 10 rises and the attenuation of the variable attenuator 31b increases, the level of VCA2 falls.

Further, if both of the receiving signal and the signal from a microphone rise, the result is to attempt to turn transistor 22 on. However, the potential of the voltage holding circuit 25 rises because of the resistor 24 of FIG. 2 if the current from the DC convertor 36 is high enough. If the potential is above the constant value (level of + terminal of the comparator 47), output level of the comparator 47 becomes GND level. Then, the transistor 22 does not operate at all.

Thus, even when the receiving signal and signal from the microphone rises simultaneously, the receiving mode is started. Accordingly, the signal from the microphone is not output as a transmitting signal from the terminal 45 or the output is restricted. On the other hand, the receiving signal is output to the receiver.

Embodiment 2

Figure 8:
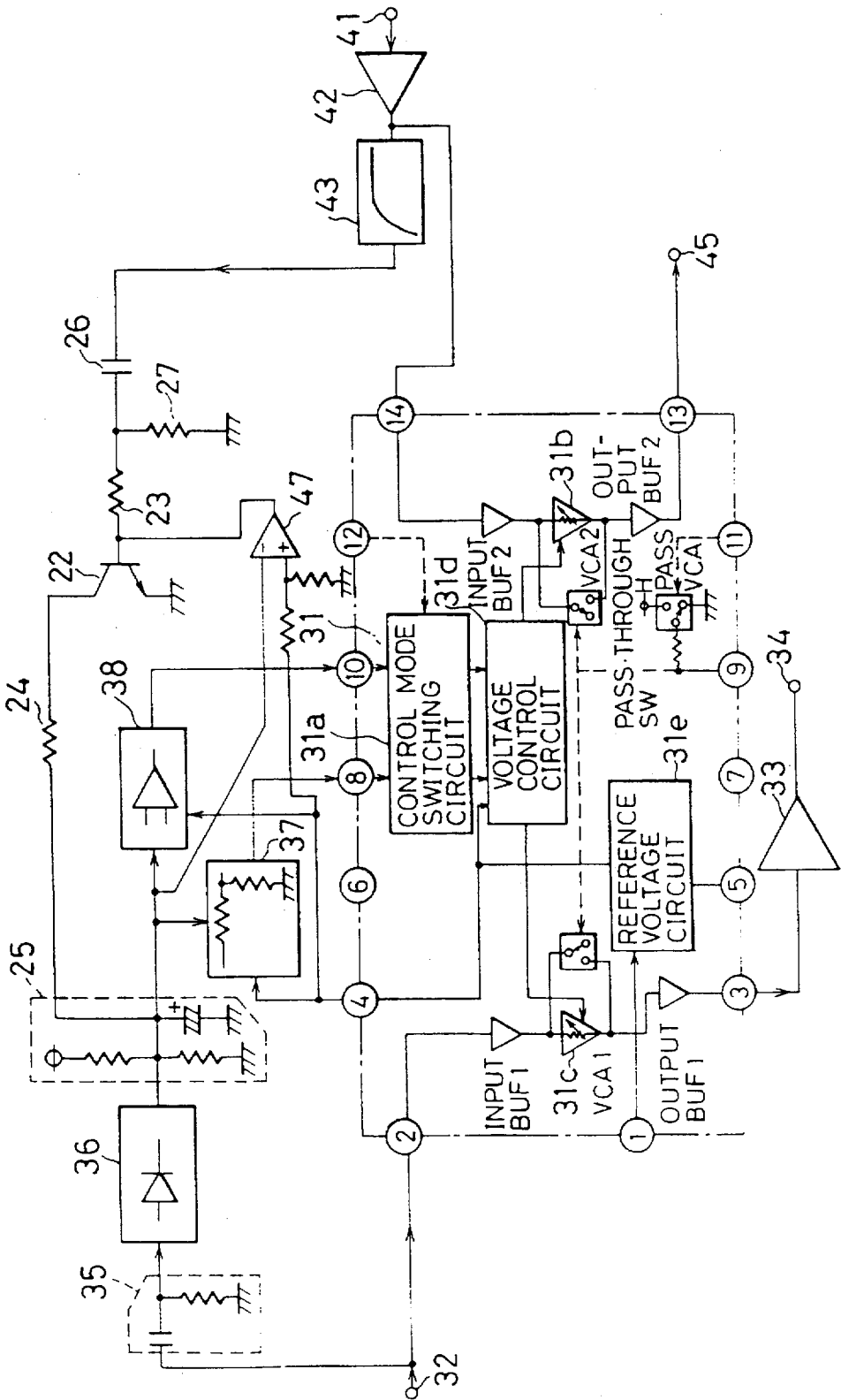
FIG. 8 shows a block diagram of a noise-controlled communication apparatus of a second embodiment.

FIG. 8 illustrates a configuration of another embodiment of a noise-controlled communication apparatus which attains the same purpose. In this embodiment, the circuit is more simplified than that of the first embodiment. That is, a transmitting signal, whose voice component is extracted at the high pass filter 43, passes through high pass filter 26 and 27 and is added directly to the base of the transistor 22.

Figure 9:
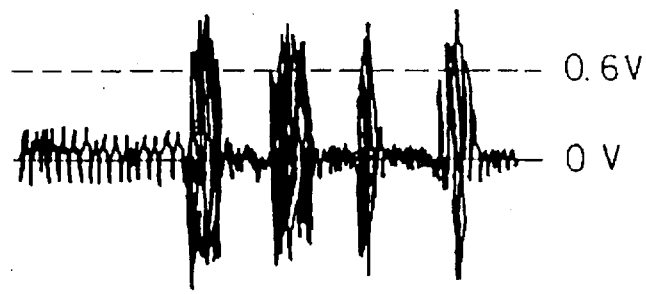
FIG. 9 shows a signal level of the operation of a transistor in the configuration of FIG. 8.

FIG. 9 illustrates the transmitting signal as applied to the transistor 22.

In FIG. 8, the base voltage of the transistor-22 is set to be a threshold. In this case, the threshold is 0.6 volt. When the extracted voice portion of the transmitting signal exceeds the threshold, the potential of the voltage holding circuit 25 is reduced by reason of the operation of transistor 22. The subsequent operations are equivalent to those described in Embodiment 1 and a detailed explanation is omitted.

Embodiment 3

Figure 10:
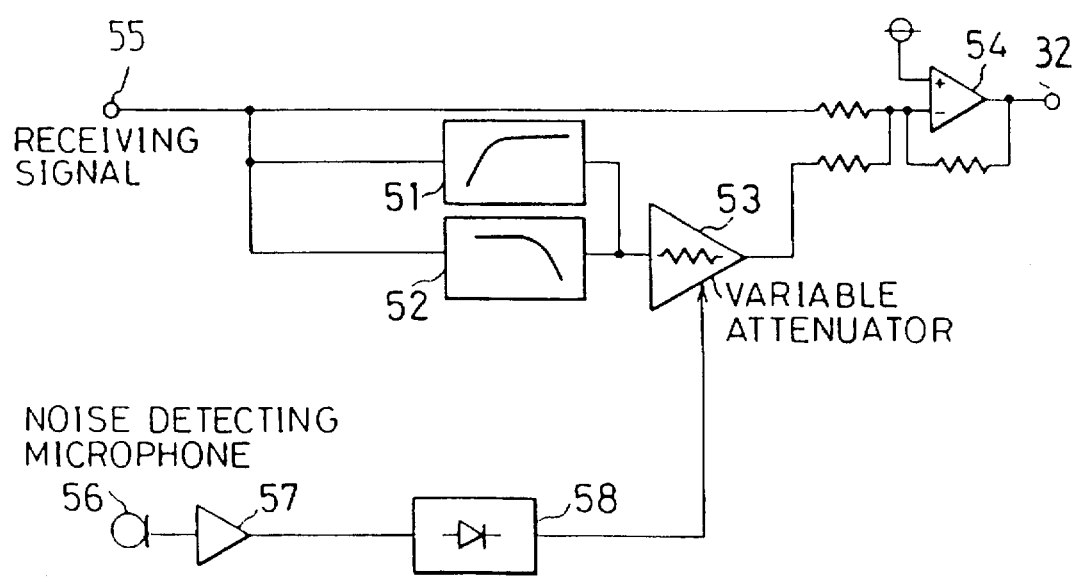
FIG. 10 shows a block diagram of the noise-controlled communication apparatus provided in the third embodiment.

FIG. 10 illustrates a configuration of a communication apparatus wherein articulation of receiving voice signals is improved according to another embodiment of the present invention. The circuit shown in FIG. 10 is connected, for example, to the input terminal 32 of the receiving signal shown in FIG. 2. In the circuit, a high pass filter 51, a low pass filter 52, a variable attenuator 53, an adder 54, a noise detecting microphone 56, an amplifier 57 and a DC convertor 58 are provided.

Figure 11:
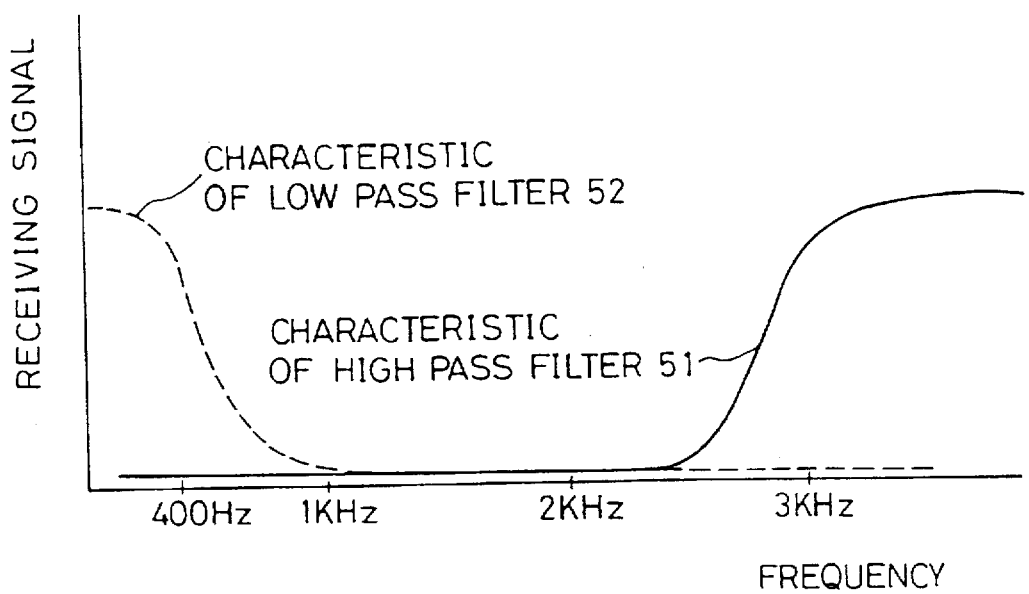
FIG. 11 shows the characteristics of a filter-of the third embodiment.

The operation of the communication apparatus of this configuration will now be described. This communication apparatus dose not change the amplification level of the entire voice spectrum according to the noise level on the receiver side. This communication apparatus emphasizes the low frequency components and high frequency components, both of which have an effect on speech recognition, thus, allowing speech to be easier heard and understood. The receiving signal is input to the adder 54 from the input terminal 32. A part of the receiving signal is input to the high pass tertiary filter 51 having a cut off frequency of about 3 KHz and a low pass filter 52 having a cut off frequency of about 400 Hz. The characteristics of the high pass filter 51 and the low pass filter 52 are shown in FIG. 11.

The signal input from the input terminal 32 is input to the adder 54. The signal also passes through the high pass filter 51 and the low pass filter 52. The low frequency components and the high pass frequency components are then input to the variable attenuator 53. DC conversion is carried out by DC convertor 58 on the ambient noise signal detected by the noise detecting microphone 56 and amplified by amplifier 57. Then, when the noise level is raised, the attenuation of the variable attenuator 53 is eliminated. That is, at high noise levels low and high frequency components of the input signal are input to the adder 54. Thus, when the noise level is raised, the components of low frequency and high frequency are emphasized. Then, the emphasized components are input to the receiver through the input terminal 32 as shown in FIG. 2.

It is also possible to remove the low pass filter 52 and emphasize only the high frequency components only with the high pass filter 51.

Embodiment 4

Figure 12:
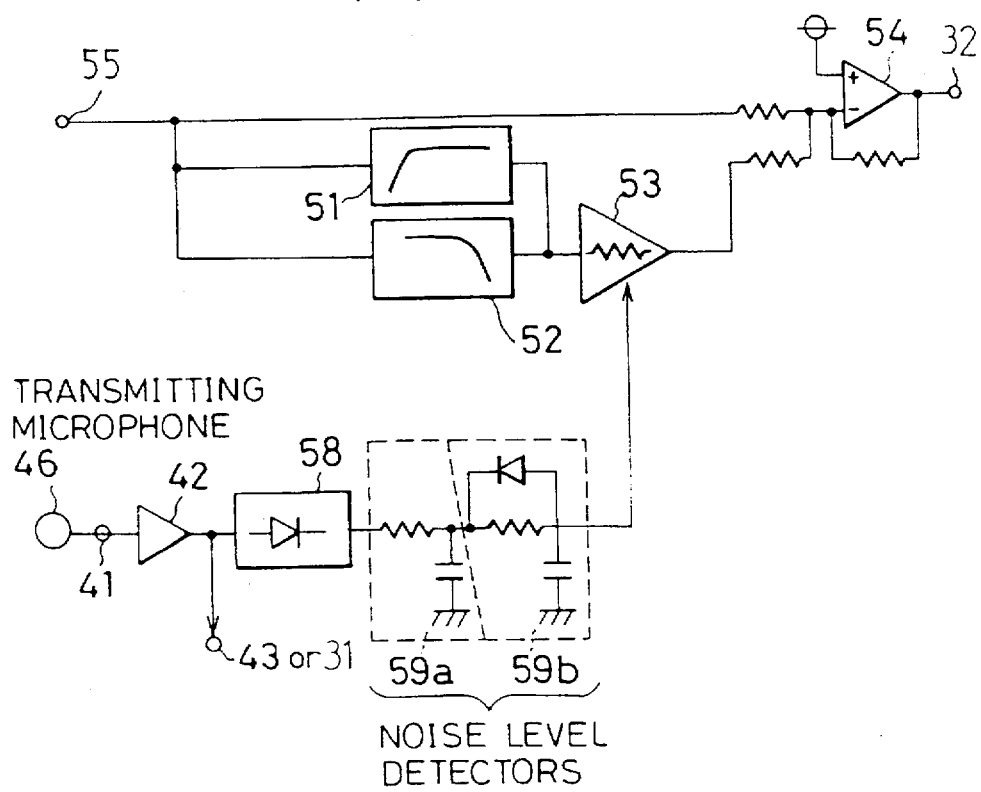
FIG. 12 shows a block diagram of the noise-controlled communication apparatus of a fourth embodiment.

FIG. 12 illustrates a configuration of another embodiment of a noise-controlled communication apparatus. In this embodiment, the circuit of the third embodiment is further simplified. That is, in the present embodiment, a transmitting microphone can be used instead of a noise detecting microphone.

In the figure, noise level detectors 59a and 59b are provided. Further, a transmitting microphone 46 generates a transmitting signal.

The operation will now be described.

The transmitting signal is input at the microphone terminal 41 through the transmitting amplifier 42 to the high pass filter 43 (see FIG. 2) or the speech control IC 31 (see FIG. 8). The transmitting signal is also connected to the DC convertor 58 and the DC convertor 58 carries out DC conversion for a part of the transmitting signal. The noise level detectors 59a and 59b detect the noise level in the DC converted transmission signal. The noise level detectors 59a to 59b are in the form of low pass filters. For example, the noise level detector 59a has a time constant of 6.8 msec. The noise level detector 59b has a rise time constant of 3.3 sec and a fall time constant of 0. Thus, the output level of the noise level detector 59b is not significantly raised by a voice which has aural intonation. However, the output level of the noise level detector 59b is raised by a lasting or extended noise.

As a result, when the noise level extends for more than a predefined time, attenuation according to the variable attenuator 53 is eliminated and the components of high frequency and low frequency are emphasized at the adder and sent to the receiver.

It is also possible to remove the low pass filter 52, as described in Embodiment 3.

Embodiment 5

Figure 13:
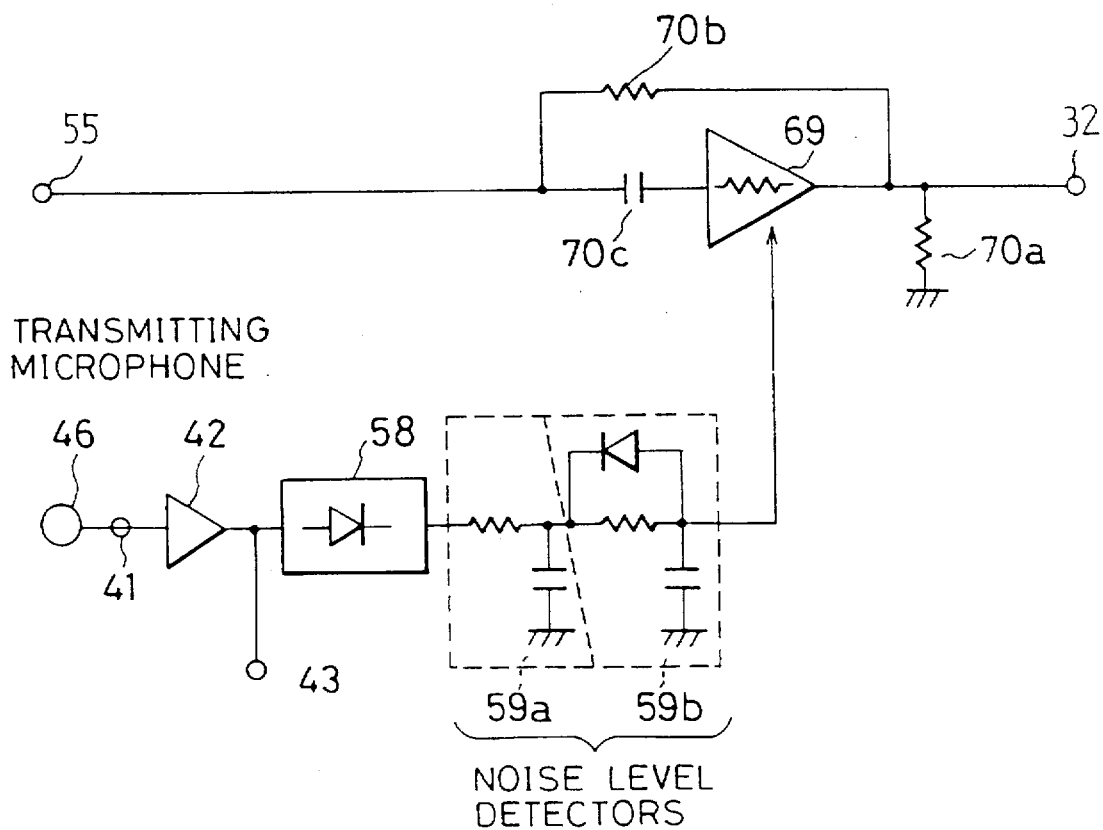
FIG. 13 shows a block diagram of the noise-controlled communication apparatus of a fifth embodiment.

FIG. 13 illustrates the configuration of another embodiment of the noise-controlled communication apparatus of the present invention. In the figure, the output of the noise level detector 59b is connected to a control terminal of a variable resistor 69.

The operation will now be described.

When the noise level (output voltage of the noise level detector 59b) is low, the resistance value of the variable resistor 69 is high. The variable resistor 69 is in series with a condenser 70c and the combination of the variable resistor 69 and the condenser 70c is connected in parallel with a resistor 70b. When the value of the variable resistor 69 is high compared to the value of the resistor 70b, the resistors 70b and 70a form the operative combination for attenuation. When the value of the variable resistor 69 is substantially lower than the value of the resister 70b, the resistors 70a and 70b form a high pass filter with the condenser 70c. When the noise level (output voltage of the noise level detector 59b) is high, the resistance value of the variable resistor 69 is low and the attenuation volume of the high frequency components is reduced according to the condenser 70c. The resistors 70a and 70b configure a high pass filter having a cut off frequency of about 3 KHz. As a result, the high frequency components are emphasized and sent to the receiver.

Embodiment 6

The above described operations can also be carried out in Digital Signal Processor (DSP) with a software system.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A communication apparatus for transmitting and receiving signals comprising:
    a noise level detector for detecting the background noise level in the vicinity of said communication apparatus and for outputting a noise level signal; and
    a frequency characteristic changing circuit for receiving a receiving signal and said noise level signal and for changing the frequency characteristics of said received receiving signal after the receipt of said receiving signal based on the level of said noise level signal, wherein said frequency characteristic changing circuit includes:
    a filter circuit for receiving said receiving signal and for changing selected frequency characteristics of said receiving signal to provide a frequency enhancing signal;
    a level convertor for receiving said noise level signal and for changing the level of said frequency enhancing signal based on said noise level signal, and for outputting a level converted frequency enhancing signal; and
    an adder for adding said received receiving signal to said level converted frequency enhancing signal to produce a modified receiving signal.

2. The communication apparatus of claim 1, wherein said filter circuit includes at least one of either a high pass filter and a low pass filter.

3. The communication apparatus of claim 1, wherein said level convertor includes a variable attenuator which is responsive to said noise level signal for receiving said frequency enhancing signal and for outputting said level converted frequency enhancing signal.

4. The communication apparatus of claim 1, wherein said frequency characteristic changing circuit includes a variable resistor which is responsive to said noise level signal and wherein said filter circuit is responsive to the resistance value of the variable resistor.

5. The communication apparatus of claim 1, wherein said noise level detector includes a microphone for producing a transmitting signal and a noise detecting circuit for detecting the noise level of the transmitting signal produced by said microphone.

6. The communication apparatus of claim 5, wherein said noise detecting circuit includes an AC to DC convertor for converting said transmitting signal to DC and time constant circuits for outputting said noise level signal from the converted DC signal.

7. A communication method for receiving a receiving signal comprising the steps of:
    detecting background noise level in the vicinity of the receiving signal; and
    receiving the receiving signal and thereafter changing the frequency characteristics of the received receiving signal based on the noise level so detected;
    wherein the step of changing the frequency characteristics of the received receiving signal includes the step of producing a frequency enhancing signal to be added to said received receiving signal and controlling the level of said frequency enhancing signal based on the magnitude of the noise level detected.

8. The communication method of claim 7, wherein the step of changing the frequency characteristics of said receiving signal includes a step of emphasizing the high frequency components of said receiving signal.

9. The communication method of claim 7, wherein the step of changing the frequency characteristics of said receiving signal includes a step of emphasizing the low frequency components of said receiving signal.

* * * * *

UNITED STATES PATENT AND TRADEMARK OFFICE
CERTIFICATE OF CORRECTION

PATENT NO. : 5,734,987
DATED : March 31, 1998
INVENTOR(S) : Takashi Shiono et al.

It is certified that error appears in the above-indentified patent and that said Letters Patent is hereby corrected as shown below:

Col. 5, line 62, "a dial key" should be -- dial keys --; same line, "a function key" should be -- function keys --;

Col. 10, line 55 (claim 7), insert -- the -- after "detecting".

Signed and Sealed this

Sixth Day of April, 1999

Q. TODD DICKINSON

Attest:

Attesting Officer

Acting Commissioner of Patents and Trademarks